(12) United States Patent
Paithane et al.

(10) Patent No.: US 11,740,976 B2
(45) Date of Patent: Aug. 29, 2023

(54) CRASH-CONSISTENT CLONE GENERATION IN A DISTRIBUTED FILE SYSTEM

(71) Applicant: Cisco Technology, Inc., San Jose, CA (US)

(72) Inventors: Chetan Chandrakant Paithane, Bengaluru (IN); Sandip Agarwala, Cupertino, CA (US); Sandeep Kumar, Patna (IN); Chandramouli Subramanian, Bengaluru (IN)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 17/376,562

(22) Filed: Jul. 15, 2021

(65) Prior Publication Data

US 2023/0018284 A1    Jan. 19, 2023

(51) Int. Cl.
| | |
|---|---|
| *G06F 11/14* | (2006.01) |
| *G06F 16/178* | (2019.01) |
| *G06F 16/182* | (2019.01) |

(52) U.S. Cl.
CPC ........ *G06F 11/1451* (2013.01); *G06F 16/178* (2019.01); *G06F 16/182* (2019.01); *G06F 2201/82* (2013.01)

(58) Field of Classification Search
CPC .. G06F 11/1451; G06F 16/182; G06F 16/178; G06F 2201/82
See application file for complete search history.

(56) References Cited

U.S. PATENT DOCUMENTS

| | | | |
|---|---|---|---|
| 9,235,479 B1 | 1/2016 | Muntz et al. | |
| 9,378,067 B1 | 6/2016 | Agarwala et al. | |
| 2007/0245104 A1* | 10/2007 | Lindemann | G06F 11/1469 711/162 |
| 2015/0193467 A1 | 7/2015 | Nagpal et al. | |
| 2015/0227575 A1* | 8/2015 | Jaquette | G06F 16/11 707/645 |
| 2015/0286423 A1* | 10/2015 | Akirav | G06F 11/2094 711/103 |
| 2017/0315877 A1* | 11/2017 | Kaplingat | G06F 11/1458 |
| 2019/0190778 A1* | 6/2019 | Easterling | G06F 9/5055 |
| 2019/0391966 A1 | 12/2019 | Iyer | |
| 2020/0034250 A1* | 1/2020 | Chandrasekaran | G06F 11/1458 |
| 2020/0042537 A1 | 2/2020 | Kaushik et al. | |

(Continued)

*Primary Examiner* — Pierre M Vital
*Assistant Examiner* — Jedidiah P Ferrer
(74) *Attorney, Agent, or Firm* — Lee & Hayes, P.C.

(57) ABSTRACT

Techniques for generating a crash-consistent clone of file(s) stored by a distributed file system are described herein. To generate the crash-consistent clone, a coordinator node may identify multiple nodes (e.g., at least a first node and a second node) of the distributed file system that are storing different portions of data of the file. The coordinator node may then send a first command to the multiple nodes to cause each of the multiple nodes to quiesce the file and clone the different portions of the data to generate the crash-consistent clone of the file. The coordinator node may then receive, from the multiple nodes, a status associated with generating the crash-consistent clone of the file. Based at least in part on the status, the coordinator node may send a second command to the multiple nodes to cause each of the multiple nodes to unquiesce the file.

20 Claims, 7 Drawing Sheets

(56) References Cited

U.S. PATENT DOCUMENTS

2020/0210378 A1\* 7/2020 Kuchibhotla ......... G06F 16/128
2021/0133047 A1\* 5/2021 Armangau .......... G06F 11/1464

\* cited by examiner

CRASH-CONSISTENT CLONE GENERATION IN A DISTRIBUTED FILE SYSTEM

TECHNICAL FIELD

The present disclosure relates generally to techniques for generating crash-consistent clones of files stored in a distributed file system.

BACKGROUND

In a distributed file system, files are typically striped across different multiple physical nodes, and input/output (I/O) operations are routed to respective nodes based on the offset and length at which I/O is requested. However, when a file is being striped across different nodes, each stripe of the file may not be completed at the same time. In other words, a first stripe of the file may be completed on a first node at a first instance of time, and a second stripe of the file may be completed on a second node at a second instance of time that is after the first time, and so forth. As such, if a request to clone the file is submitted to the nodes between the first instance of time and the second instance of time, the clone may be inconsistent and not include each stripe of the file.

BRIEF DESCRIPTION OF THE DRAWINGS

The detailed description is set forth below with reference to the accompanying figures. In the figures, the left-most digit(s) of a reference number identifies the figure in which the reference number first appears. The use of the same reference numbers in different figures indicates similar or identical items. The systems depicted in the accompanying figures are not to scale and components within the figures may be depicted not to scale with each other.

DESCRIPTION OF EXAMPLE EMBODIMENTS

Overview

This disclosure describes various techniques for generating crash-consistent clones of files stored in a distributed file system. By way of examples, and not limitation, a method according to the various techniques described in this disclosure for generating a crash-consistent clone of a file stored by a distributed file system may include receiving, at a coordinator node of the distributed file system, a request to generate the crash-consistent clone of the file. The method may also include identifying, by the coordinator node, multiple nodes of the distributed file system that are storing different portions of data of the file, the multiple nodes including at least a first node storing a first portion of the data and a second node storing a second portion of the data. The coordinator node may then send, to the multiple nodes, a first command that is configured to cause each of the multiple nodes to quiesce the file and clone the different portions of the data to generate the crash-consistent clone of the file. The method may also include receiving, at the coordinator node and from the multiple nodes, a status associated with generating the crash-consistent clone of the file. Based at least in part on the status, the coordinator node may send a second command to the multiple nodes. The second command may be configured to cause each of the multiple nodes to unquiesce the file and/or remove the crash-consistent clone of the file.

The techniques described herein may additionally, or alternatively, be performed by a system and/or device having non-transitory computer-readable media storing computer-executable instructions that, when executed by one or more processors, performs the method described above.

Example Embodiments

As noted above, in a distributed file system, files are typically striped across different multiple physical nodes, and input/output (I/O) operations are routed to respective nodes based on the offset and length at which I/O is requested. However, when a file is being striped across different nodes, each stripe of the file may not be completed at the same time. In other words, a first stripe of the file may be completed on a first node at a first instance of time, and a second stripe of the file may be completed on a second node at a second instance of time that is after the first time, and so forth. As such, if a request to clone the file is submitted to the nodes between the first instance of time and the second instance of time, the clone may be inconsistent and not include each stripe of the file.

Accordingly, this application describes various techniques for generating crash-consistent clones of files stored in a distributed file system. In some examples, the techniques described herein further provide for generating a crash-consistent clone of a file or set of files in a hyper-converged appliance that has a distributed file system. For instance, the hyper-converged appliance may include a Controller Virtual Machine (VM) that implements a Storage Controller which runs the distributed file system in a user space and, with the help of other Controller VMs in a cluster, virtualizes all the storage hardware in the cluster as a global resource pool. As such, the technologies disclosed include a scalable, software-level mechanism for taking a crash-consistent clone of a single file or a group of files which could map to a file within a virtual machine, a group of virtual machines, a group of logical unit numbers (LUNs), or any selected group of files, which is highly optimized to be done at the storage backend with a highly available metadata optimized distributed file system. The techniques described in this disclosure scale well with different number of files and the total time for a single file or a group of files remains invariant based on size and usage.

To achieve a consistent state for cloning a file, writes to the file may need to be quiesced across all the stripes of the file. In other words, all the acknowledged write operations should be complete before quiescing the file and when there are no inflight writes on any stripes, a clone request should be issued. In some examples, a coordinator node of the distributed file system (e.g., Namespace Vnode) may receive one or more files associated with a virtual machine (VM) for which a crash-consistent clone needs to be taken. In response, the coordinator node will identify one or more storage nodes (e.g., Filetree Vnodes) on which stripes are stored for every source file involved in the clone creation. In some examples, the coordinator node may submit commands to these storage nodes to quiesce the source index nodes (inodes) and/or the file. Quiescing may let all acknowledged write operations to complete. After that, the source inodes and/or the file will be marked as quiesced, and any write operations requested on the storage nodes during this window may be stored in a queue. After this, the clone may be created at the respective storage nodes, and once this is done for all source inodes and/or files at the storage node layer, a status may be returned to the coordinator node.

In some examples, if the status indicates a success, the coordinator node may submit an unquiesce operation to the storage nodes. However, if the status indicates a failure, the coordinator node may submit an abort operation to the storage nodes. In some instances, the difference between the unquiesce operations and the abort operations is that the abort operations may cleanup or remove the cloned inode and/or file. In some examples, the coordinator node will identify the one or more storage nodes on which stripes are stored for every source file involved in the clone creation. The coordinator node may then submit the unquiesce and/or abort commands to these storage nodes to unquiesce/abort the source inodes and/or files. These unquiesce/abort commands may reach the storage nodes and mark the source inodes and/or file as unquiesced, and then resubmit write operations stored in the queue.

In these ways, and in other ways as described herein, crash-consistent clones of files stored in a distributed file system may be generated. The disclosed techniques are efficient over prior techniques and do not cause latency-sensitive applications to crash and/or timeout under various conditions. Additionally, the disclosed techniques scale well with number of files and the total time for a single file or a group of files remains invariant of size and usage. These advantages, as well as other improvements and advantages not listed above, will be easily apparent to those having ordinary skill in the art.

By way of example, and not limitation, a method according to the techniques described herein for generating a crash-consistent clone of a file may include receiving, at a coordinator node of a distributed file system, a request to generate the crash-consistent clone of the file. In some examples, the coordinator node may be a Namespace Vnode that operates in the user space of the distributed file system. In some instances, the file may be associated with a virtual machine or otherwise mappable for use by a virtual machine. In various examples, the crash-consistent clones of files are generated at regularly scheduled intervals or periods of time (e.g., every minute, 15 minutes, half-hour, hour, etc.). Additionally, or alternatively, the crash-consistent clones may be generated on demand when requested by, for instance, a user.

In some examples, the coordinator node may identify multiple nodes (e.g., storage nodes, Filetree Vnodes, etc.) of the distributed file system that are storing different portions of data of the file, the multiple nodes including at least a first node storing a first portion of the data and a second node storing a second portion of the data. In some instances, the first portion of the data may be a first stripe of the file and the second portion of the data may be a second stripe of the file. In various examples, the multiple nodes may include any number of nodes of the distributed file system (e.g., 2, 3, 4, 5, 6, all, etc.).

The method may also include sending, by the coordinator node, a first command to the multiple nodes, the first command configured to cause each of the multiple nodes to: quiesce the file; and clone the different portions of the data to generate the crash-consistent clone of the file. In some instances, causing the multiple nodes to quiesce the file may include causing the multiple nodes to refrain from completing write operations that were received by the multiple nodes after receiving the first command. In this way, write operations that were received and/or acknowledged by the multiple nodes prior to receiving the first command may be completed by the multiple nodes before quiescing the file. In some examples, quiescing the file may include storing, in a queue, the write operations that were received by the multiple nodes after receiving the first command. In some instances, the multiple nodes may not clone the different portions of the data until the file has been quiesced. For instance, the first node may not generate a clone of the first portion of the data until the first node has marked the file as quiesced, the second node may not generate a clone of the second portion of the data until the second node has marked the file as quiesced, and so forth. In some examples, marking the file as quiesced may include marking a source inode as quiesced.

In some examples, the coordinator node may receive, from the multiple nodes, a status associated with generating the crash-consistent clone of the file. In some instances, the status may be a cumulative status associated with each of the multiple nodes, and the status may indicate whether each of the multiple nodes successfully created the crash-consistent clone for its respective portion of data (e.g., stripe). Based at least in part on the status, the coordinator node may send a second command to the multiple nodes. The second command may be configured to cause each of the multiple nodes to unquiesce the file. In some examples, after the file is unquiesced by the multiple nodes, the multiple nodes may complete any write operations that were received by the multiple nodes after receiving the first command. For instance, after the file is unquiesced, the write operations stored in the queue may be acknowledged and completed by the multiple nodes. In at least one example, if the status indicates a failure associated with generating the crash-consistent clone of the file, the second command may further be configured to cause each of the multiple nodes to delete the crash-consisted clone, or otherwise abort the crash-consistent clone.

In some examples, different shards of a quiesced file may cloned by creating a copy of the file's "inode" objects without copying any data to generate a fast and thin-provisioned crash-consistent clone of the file. Additionally, in some instances, clones can be marked as read-only (e.g., "snapshots") and usable for backups, analytics, and the like.

Certain implementations and embodiments of the disclosure will now be described more fully below with reference to the accompanying figures, in which various aspects are shown. However, the various aspects may be implemented in many different forms and should not be construed as limited to the implementations set forth herein. The disclosure encompasses variations of the embodiments, as described herein. Like numbers refer to like elements throughout.

Figure 1A:
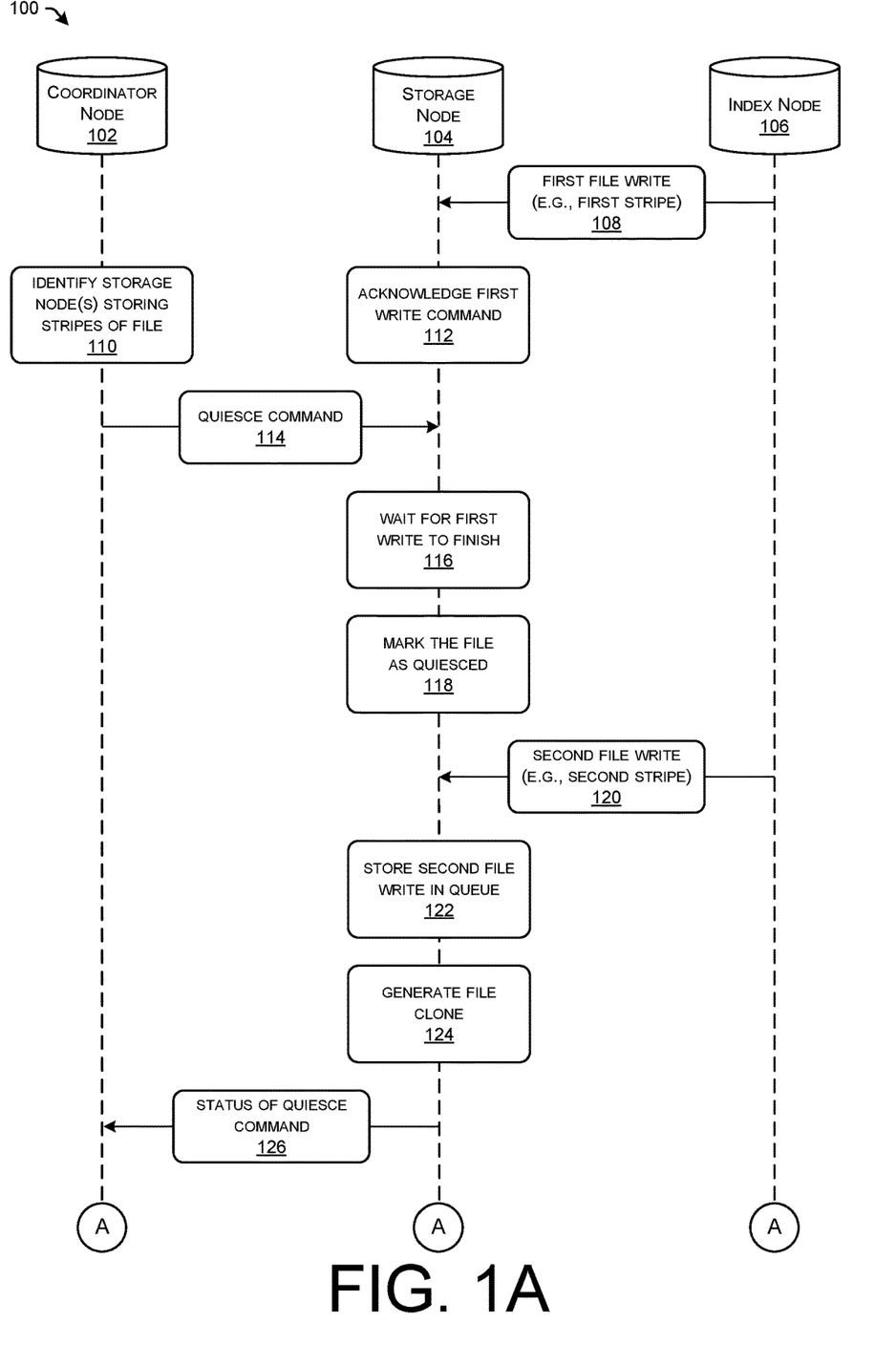
FIGS. 1A-1C collectively illustrate an example data flow associated with generating a crash-consistent clone of a file stored by a distributed file system.
Figure 1B:
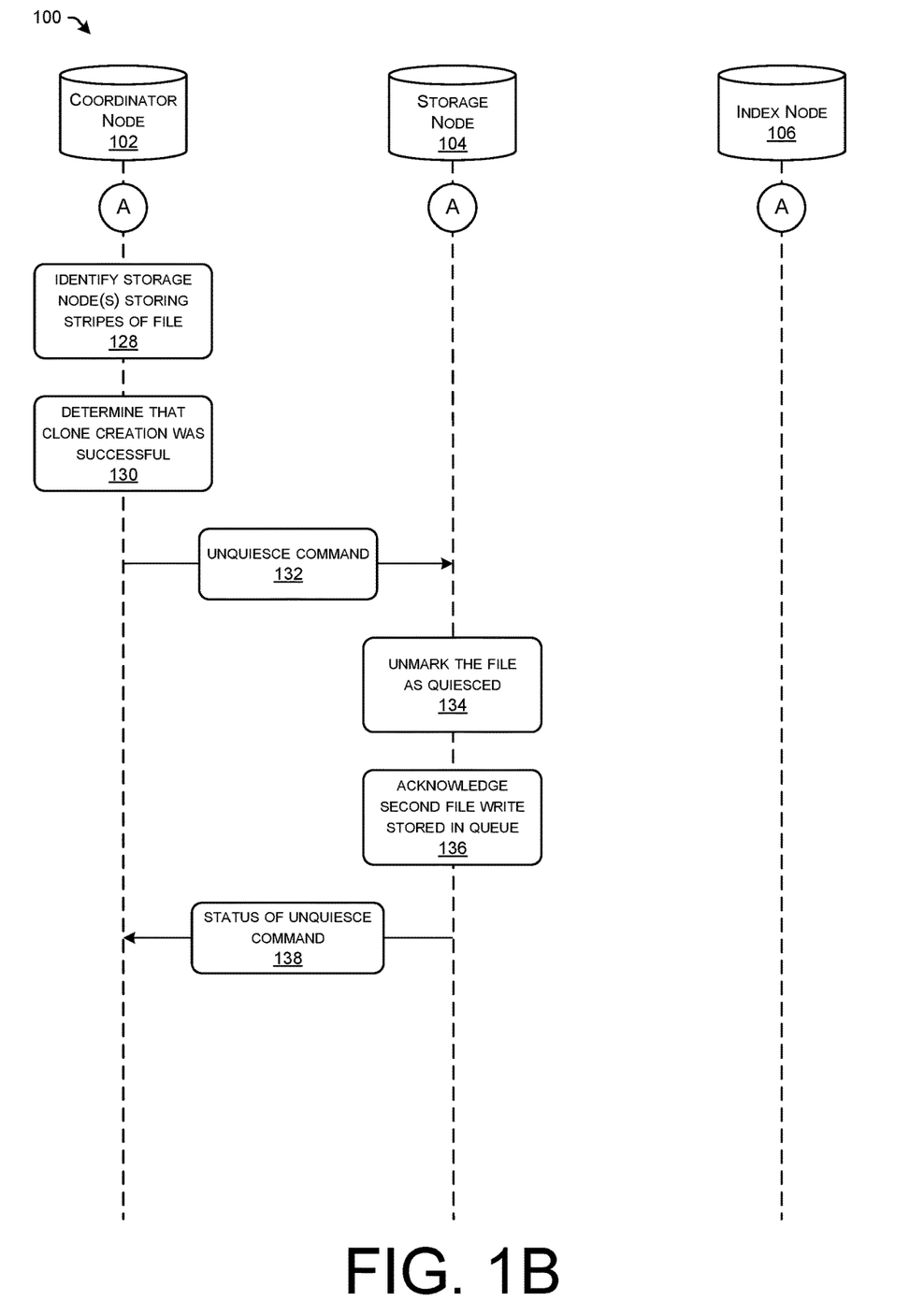
Figure 1C:
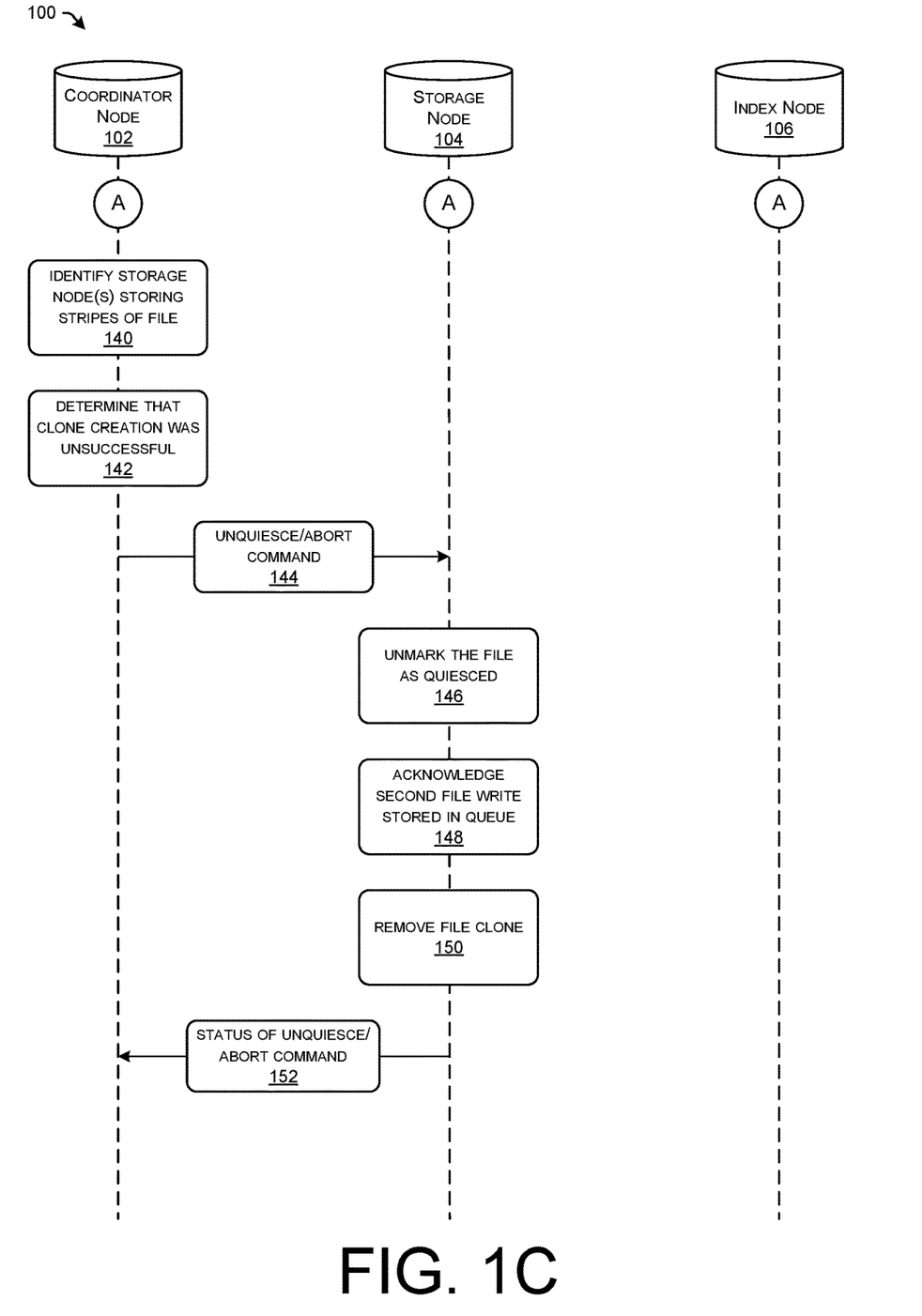

FIGS. 1A-1C collectively illustrate an example data flow 100 associated with generating a crash-consistent clone of a file stored by a distributed file system. The distributed file system may include a coordinator node 102, a storage node 104, and an index node 106, each of which are involved in the data flow 100. Additionally, although the exemplary data flow 100 is shown in FIGS. 1A-1C as only including a single storage node 104 and index node 106 for simplicity, it is to be understood that the data flow 100 may include multiple storage nodes 104 and multiple index nodes 106, as well as, in some instances, multiple coordinator nodes 102.

At operation 108, the index node 106 submits a first file write command to the storage node 104. The first file write command may include a first stripe of a file that is to be stored on the storage node 104. At operation 110, the coordinator node 102 identifies one or more storage nodes that are storing stripes of data of a file that is to be cloned. For instance, the coordinator node 102 may determine that the storage node 104 is storing a stripe of data from a file that is to be cloned. At operation 112, the storage node 104 acknowledges the first write command received from the index node 106. In some examples, the operations 110 and 112 may happen in a different order than presented in FIG. 1A. For instance, operation 110 may occur after operation 112, or even before operation 108.

At operation 114, the coordinator node 102 submits a quiesce command to the storage node 104 (as well as other storage nodes storing stripes of data of the file, if applicable). Because the quiesce command is submitted to the storage node 104 after the storage node 104 has acknowledged the first write command, at operation 116 the storage node 104 will wait for the first write to finish. Once the first write has finished, then the storage node 104 may mark the file and/or the index node 106 as quiesced.

In some examples, after the storage node 104 has marked the file and/or index node 106 as quiesced, the storage node 104 may, at operation 120, receive a second file write command from the index node 106. The second file write command may include a second stripe of the file that is to be stored on the storage node 104. However, because the storage node 104 has already marked the file and/or the index node 104 as quiesced, the storage node 104 may, at operation 122, store the second file write command in a queue to maintain consistency for the clone. At operation 124, the storage node 104 may generate the clone of the file and/or the stripe of the file stored by the storage node 104.

At operation 126, the storage node 104 may submit a status of the quiesce command to the coordinator node 102. If the status of the quiesce command indicates a success, then the data flow 100 may proceed to operation 128 of FIG. 1B. However, if the status of the quiesce command indicates a failure, then the data flow 100 may proceed to operation 140 of FIG. 1C.

At operation 128, if the status indicates a success, the coordinator node 102 identifies the one or more storage nodes that are storing the stripes of data of the file that is being cloned (e.g., the one or more storage nodes that were quiesced). At operation 130, the coordinator node 102 determines that the clone creation was successful. For instance, the coordinator node 102 may determine that clone creation was successful based at least in part on receiving the status from the storage node 104.

At operation 132, the coordinator node 102 submits an unquiesce command to the storage node 104 (as well as any other storage nodes that were quiesced to generate the clone of the file, if applicable). At operation 134, the storage node 104 may unmark the file and/or the index node 106 as quiesced based at least in part on receiving the unquiesce command. After the storage node 104 unmarks the file as quiesced, the storage node 104 may, at operation 136, acknowledge the second file write stored in the queue, as well as return to normal operation. At operation 138, the storage node 104 may send a status of the unquiesce command to the coordinator node 102.

At operation 140, if the status indicates a failure, the coordinator node 102 identifies the one or more storage nodes that are storing the stripes of data of the file that is being cloned (e.g., the one or more storage nodes that were quiesced). At operation 142, the coordinator node 102 determines that the clone creation was unsuccessful. For instance, the coordinator node 102 may determine that clone creation was unsuccessful based at least in part on receiving the status from the storage node 104.

At operation 144, the coordinator node 102 submits an unquiesce/abort command to the storage node 104 (as well as any other storage nodes that were quiesced to generate the clone of the file, if applicable). At operation 146, the storage node 104 may unmark the file and/or the index node 106 as quiesced based at least in part on receiving the unquiesce command. After the storage node 104 unmarks the file as quiesced, the storage node 104 may, at operation 148, acknowledge the second file write stored in the queue, as well as return to normal operation. At operation 150, based at least in part on receiving the abort command, the storage node 104 may remove the file clone. At operation 152, the storage node 104 may send a status of the unquiesce command to the coordinator node 102.

Figure 2:
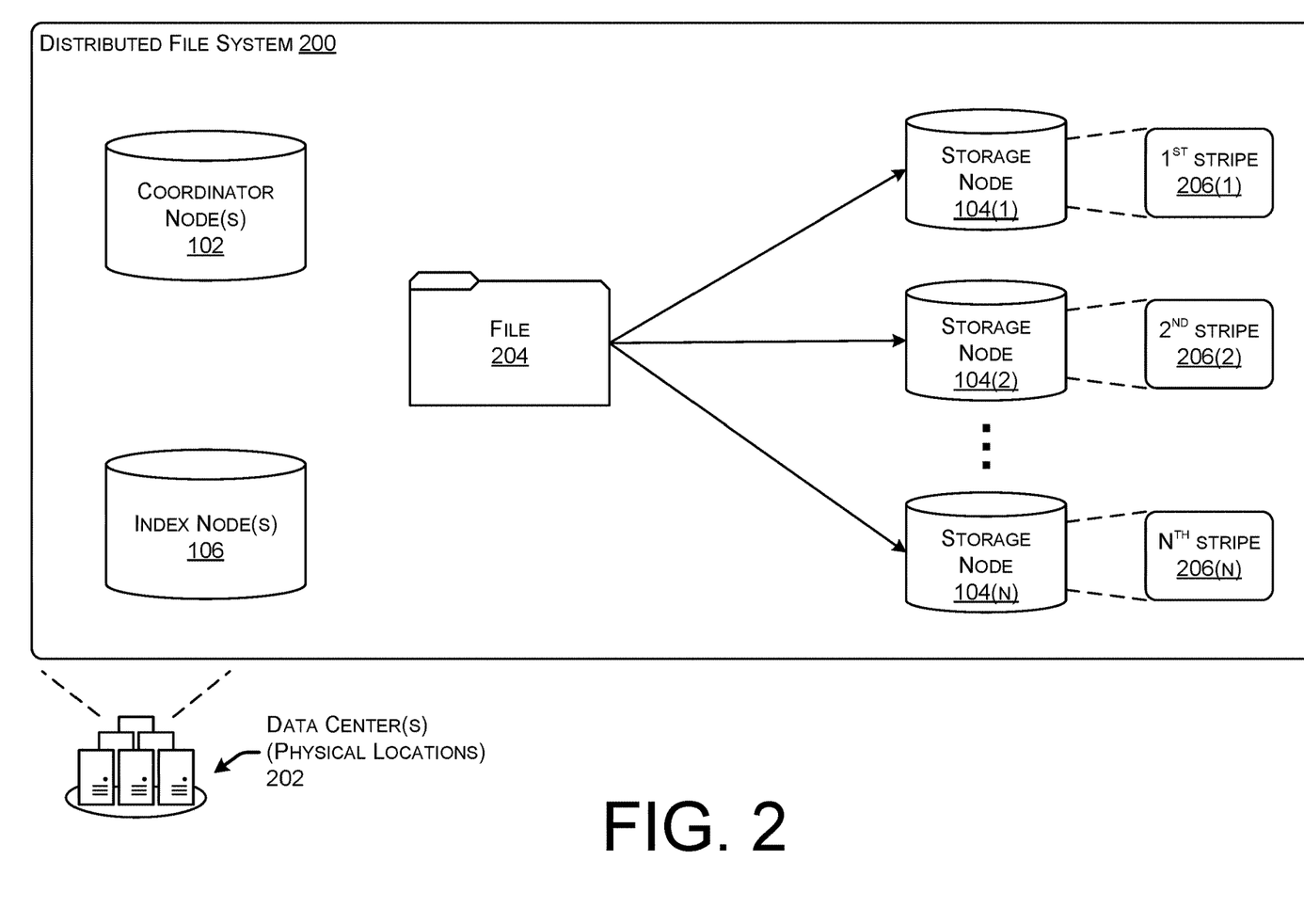
FIG. 2 is a system diagram illustrating example detail of a distributed file system for implementing some of the technologies described herein.

FIG. 2 is a system diagram illustrating example detail of a distributed file system 200 for implementing some of the technologies described herein. The example distributed file system 200 includes one or more coordinator node(s) 102, storage nodes 104(1)-104(N) (hereinafter referred to collectively as "storage nodes 104") (where N represents any number greater than or equal to one), and one or more index node(s) 106.

The distributed file system 200 may be located within one or more data centers 104. The one or more data centers 104 may be physical facilities or buildings located across geographic areas that are designated to store networked devices that are part of the distributed file system 200. The data centers 104 may include various networking devices, as well as redundant or backup components and infrastructure for power supply, data communications connections, environmental controls, and various security devices. In some examples, the data centers 104 may include one or more virtual data centers which are a pool or collection of cloud infrastructure resources specifically designed for enterprise needs, and/or for cloud-based service provider needs. Generally, the data centers 104 (physical and/or virtual) may provide basic resources such as processor (CPU), memory (RAM), storage (disk), networking (bandwidth), security, and the like. However, in some examples the devices of the distributed file system 200 may not be located in explicitly defined data centers 104 but may be located in other locations or buildings.

The index node(s) 106 may use data striping to save different portions of data of the file 204 onto each of the different storage nodes 104. For instance, a first stripe 206(1) of data of the file 204 may be saved to a first storage node 104(1), a second stripe 206(2) of data of the file 204 may be saved to a second storage node 104(2), an Nth stripe 206(N) of data of the file 204 may be saved to an Nth storage node 104(N), and so forth. As used herein, "data striping" is a technique of segmenting logically sequential data, such as a file, so that consecutive segments are stored on different physical storage devices.

When a clone of the file 204 is to be generated, the coordinator node(s) 102 may determine which ones of the storage nodes 104 that the file 204 is striped across. For instance, a coordinator node 102 may determine that the storage nodes 104(1)-104(N) are storing different portions of data from the file 204 that is to be cloned. Additionally, the coordinator node 102 may submit quiesce commands to each of the identified storage nodes 104(1)-104(N).

In some examples, after receiving the quiesce command from the coordinator node 102, the storage nodes 104(1)-104(N) may mark the file 204 and/or the index node(s) 106 as quiesced. While the file 204 and/or the index node(s) 106 is/are quiesced, the storage nodes 104(1)-104(N) may finish write commands that were acknowledged by the storage nodes 104(1)-104(N) prior to receiving the quiesce command, as well as refrain from acknowledging any new write commands received after the quiesce command. In some examples, any new write commands received by the storage nodes 104(1)-104(N) while the storage nodes 104(1)-104(N) are quiesced may be stored in a queue. Once the storage nodes 104(1)-104(N) mark the file 204 and/or the index node(s) 106 as quiesced, the storage nodes 104(1)-104(N) may generate the clone of the file 204. In some examples, each one of the storage nodes 104(1)-104(N) may generate a clone of the stripe of data of the file 204 that is saved to its resources.

After the crash-consistent clone of the file 204 is generated, the coordinator node 102 may submit an unquiesce command to the storage nodes 104(1)-104(N). The storage nodes 104(1)-104(N) may unmark the file 204 and/or the index node(s) 106 as quiesced based at least in part on receiving the unquiesce command. In some examples, if the coordinator node 102 determines that the clone creation was unsuccessful, the coordinator node 102 may additionally, or alternatively, submit an abort command to the storage nodes 104(1)-104(N). In response to receiving the abort command, the storage nodes 104(1)-104(N) may remove the cloned file 204 and/or cloned index node.

Figure 3:
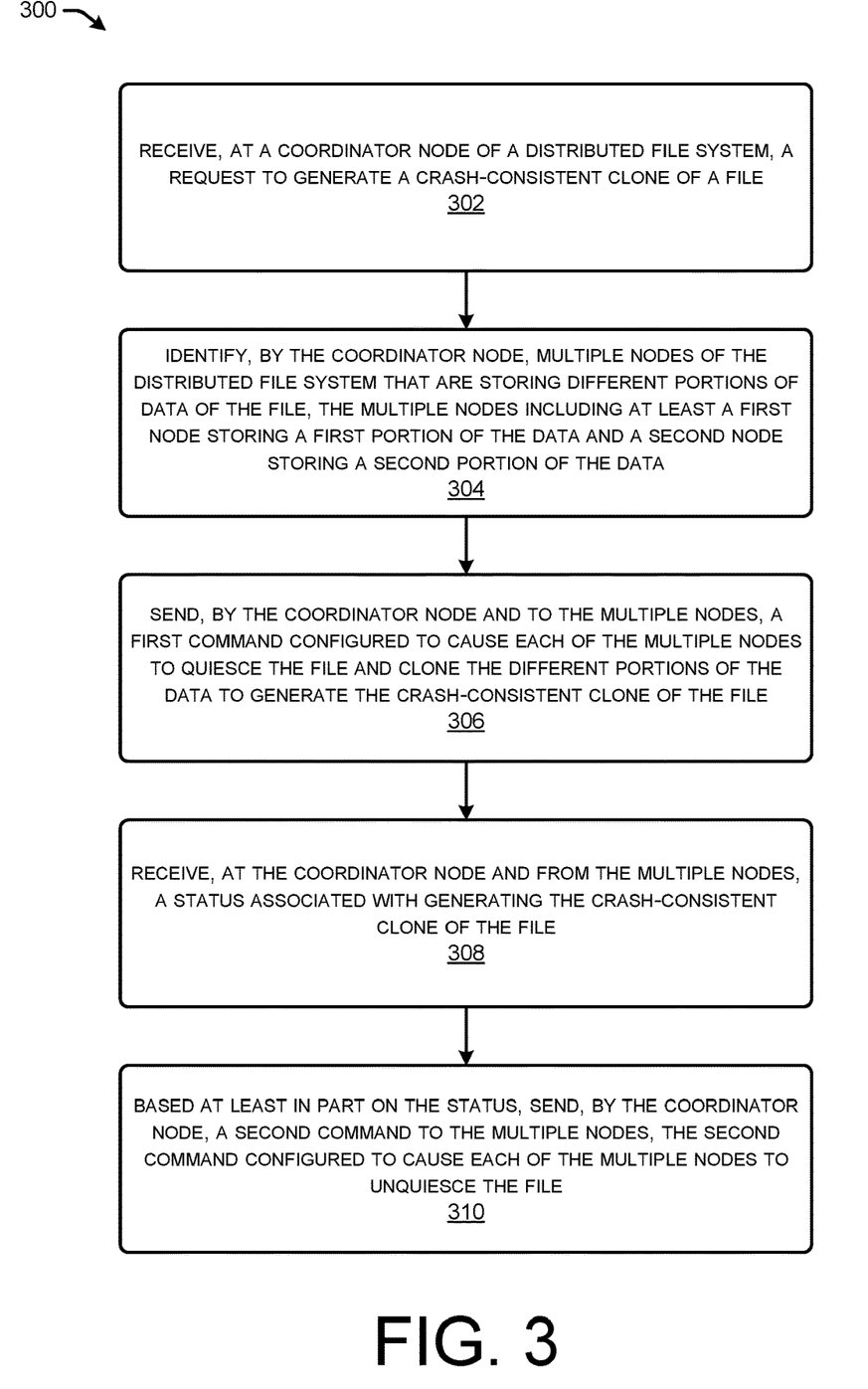
FIG. 3 is a flow diagram illustrating an example method that may be performed at least partly by a coordinator node of a distributed file system to generate a crash-consistent clone of a file.

FIG. 3 is a flow diagram illustrating an example method 300 that may be performed at least partly by a coordinator node of a distributed file system to generate a crash-consistent clone of a file. The logical operations described herein with respect to FIG. 3 may be implemented (1) as a sequence of computer-implemented acts or program modules running on a computing system and/or (2) as interconnected machine logic circuits or circuit modules within the computing system.

The implementation of the various components described herein is a matter of choice dependent on the performance and other requirements of the computing system. Accordingly, the logical operations described herein are referred to variously as operations, structural devices, acts, or modules. These operations, structural devices, acts, and modules can be implemented in software, in firmware, in special purpose digital logic, and any combination thereof. It should also be appreciated that more or fewer operations might be performed than shown in FIG. 3 and described herein. These operations can also be performed in parallel, or in a different order than those described herein. Some or all of these operations can also be performed by components other than those specifically identified. Although the techniques described in this disclosure is with reference to specific components, in other examples, the techniques may be implemented by less components, more components, different components, or any configuration of components.

The method 300 shown in FIG. 3 begins at operation 302, which includes receiving, at a coordinator node of a distributed file system, a request to generate a crash-consistent clone of a file. For instance, the coordinator node 102 that is part of the distributed file system network 200 may receive the request to generate the crash-consistent clone of the file 204. The file 204 may be associated with a virtual machine, or otherwise mappable for use by a virtual machine.

At operation 304, the method 300 includes identifying, by the coordinator node, multiple nodes of the distributed file system that are storing different portions of data of the file, the multiple nodes including at least a first node storing a first portion of the data and a second node storing a second portion of the data. For instance, the coordinator node 102 may identify the storage nodes 104(1)-104(N) that are storing the different portions (e.g., first strip 206(1), second stripe 206(2), etc.) of the data of the file 204.

At operation 306, the method 300 includes sending, by the coordinator node and to the multiple nodes, a first command configured to cause each of the multiple nodes to quiesce the file and clone the different portions of the data to generate the crash-consistent clone of the file. For instance, the coordinator node 102 may send the first command to each of the storage nodes 104(1)-104(N) to cause them to quiesce the file 204 (and/or the index node(s) 106) and, once the file 204 is marked as quiesced, clone the different portions of the data to generate the crash-consistent clone of the file 204.

At operation 308, the method 300 includes receiving, at the coordinator node and from the multiple nodes, a status associated with generating the crash-consistent clone of the file. For instance, the coordinator node 102 may receive, from each of the storage nodes 104(1)-104(N), the status associated with generating the crash-consistent clone of the file 204. In some examples, the status may be a cumulative status associated with a command, such as the quiesce command, a snapshot command, and the like.

At operation 310, the method 300 includes, based at least in part on the status, sending, by the coordinator node, a second command to the multiple nodes, the second command configured to cause each of the multiple nodes to unquiesce the file. For instance, the coordinator node 102 may send the second command to the storage nodes 104(1)-104(N) based at least in part on the status.

Figure 4:
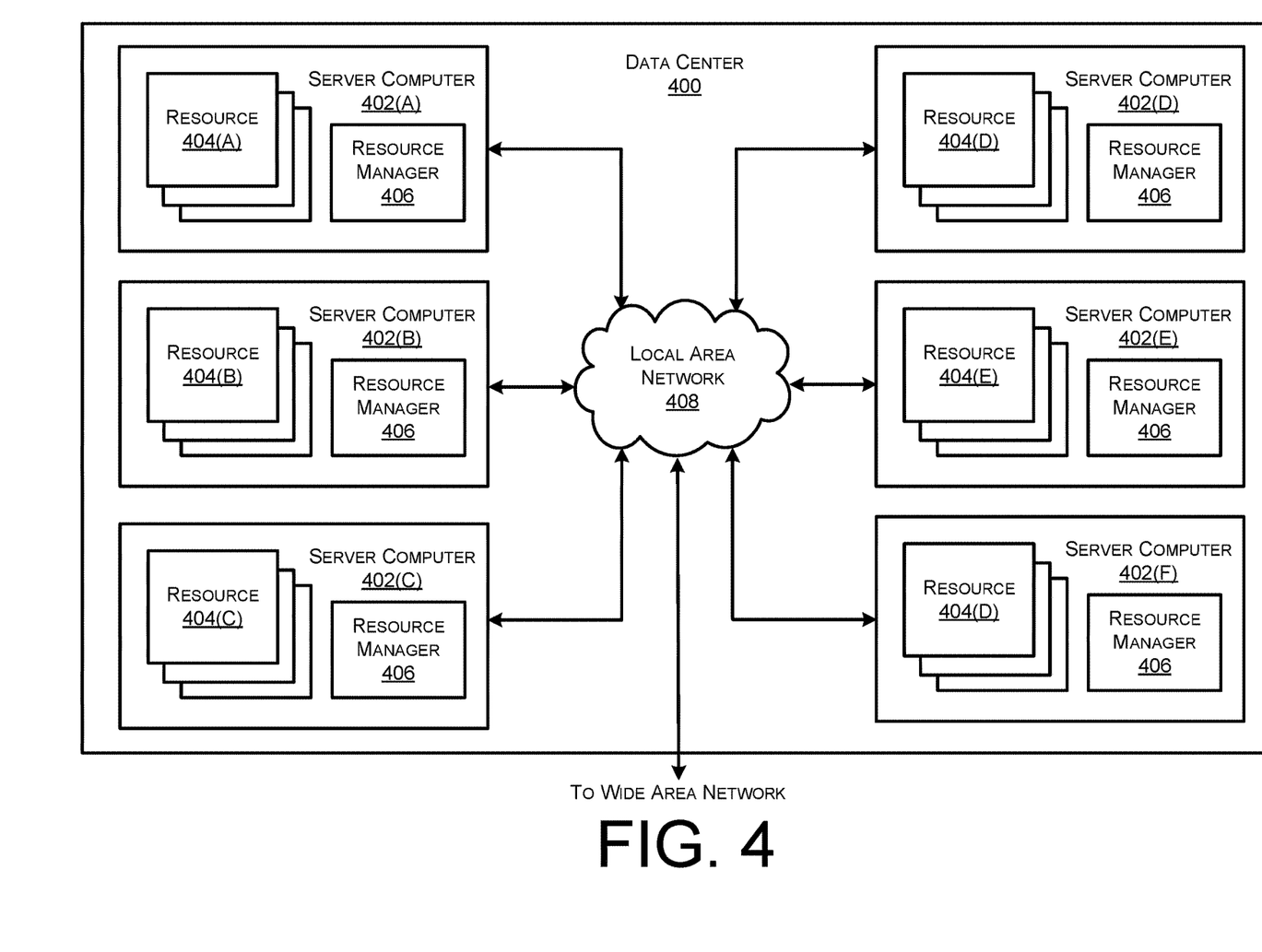
FIG. 4 is a computing system diagram illustrating an example configuration of a data center that can be utilized to implement aspects of the technologies disclosed herein.

FIG. 4 is a computing system diagram illustrating an example configuration of a data center 400 that can be utilized to implement aspects of the technologies disclosed herein. The example data center 400 shown in FIG. 4 includes several server computers 402A-402F (which might be referred to herein singularly as "a server computer 402" or in the plural as "the server computers 402") for providing computing resources. In some examples, the resources and/or server computers 402 may include, or correspond to, any type of networked device or node described herein. Although described as servers, the server computers 402 may comprise any type of networked device, such as servers, switches, routers, hubs, bridges, gateways, modems, repeaters, access points, etc.

The server computers 402 can be standard tower, rack-mount, or blade server computers configured appropriately for providing computing resources. In some examples, the server computers 402 may provide computing resources 404 including data processing resources such as VM instances or hardware computing systems, database clusters, computing clusters, storage clusters, data storage resources, database resources, networking resources, security, packet inspection, and others. Some of the servers 402 can also be configured to execute a resource manager 406 capable of instantiating and/or managing the computing resources. In the case of VM instances, for example, the resource manager 406 can be a hypervisor or another type of program configured to enable the execution of multiple VM instances on a single server computer 402. Server computers 402 in the data center 400 can also be configured to provide network services and other types of services.

In the example data center 400 shown in FIG. 4, an appropriate local area network (LAN) 408 is also utilized to interconnect the server computers 402A-402F. It should be appreciated that the configuration and network topology described herein has been greatly simplified and that many more computing systems, software components, networks, and networking devices can be utilized to interconnect the various computing systems disclosed herein and to provide the functionality described above. Appropriate load balancing devices or other types of network infrastructure components can also be utilized for balancing a load between data centers 400, between each of the server computers 402A-402F in each data center 400, and, potentially, between computing resources in each of the server computers 402. It should be appreciated that the configuration of the data center 400 described with reference to FIG. 4 is merely illustrative and that other implementations can be utilized.

In some examples, the server computers 402 may each execute one or more application containers and/or virtual machines to perform techniques described herein. For instance, the containers and/or virtual machines may serve as nodes in the distributed file system 200.

In some instances, the data center 400 may provide computing resources, like application containers, VM instances, and storage, on a permanent or an as-needed basis. Among other types of functionality, the computing resources provided by a cloud computing network may be utilized to implement the various services and techniques described above. The computing resources 404 provided by the cloud computing network can include various types of computing resources, such as data processing resources like application containers and VM instances, data storage resources, networking resources, data communication resources, network services, and the like.

Each type of computing resource 404 provided by the cloud computing network can be general-purpose or can be available in a number of specific configurations. For example, data processing resources can be available as physical computers or VM instances in a number of different configurations. The VM instances can be configured to execute applications, including web servers, application servers, media servers, database servers, some or all of the network services described above, and/or other types of programs. Data storage resources can include file storage devices, block storage devices, and the like. The cloud computing network can also be configured to provide other types of computing resources 404 not mentioned specifically herein.

The computing resources 404 provided by a cloud computing network may be enabled in one embodiment by one or more data centers 400 (which might be referred to herein singularly as "a data center 400" or in the plural as "the data centers 400"). The data centers 400 are facilities utilized to house and operate computer systems and associated components. The data centers 400 typically include redundant and backup power, communications, cooling, and security systems. The data centers 400 can also be located in geographically disparate locations. One illustrative embodiment for a data center 400 that can be utilized to implement the technologies disclosed herein will be described below with regard to FIG. 5.

Figure 5:
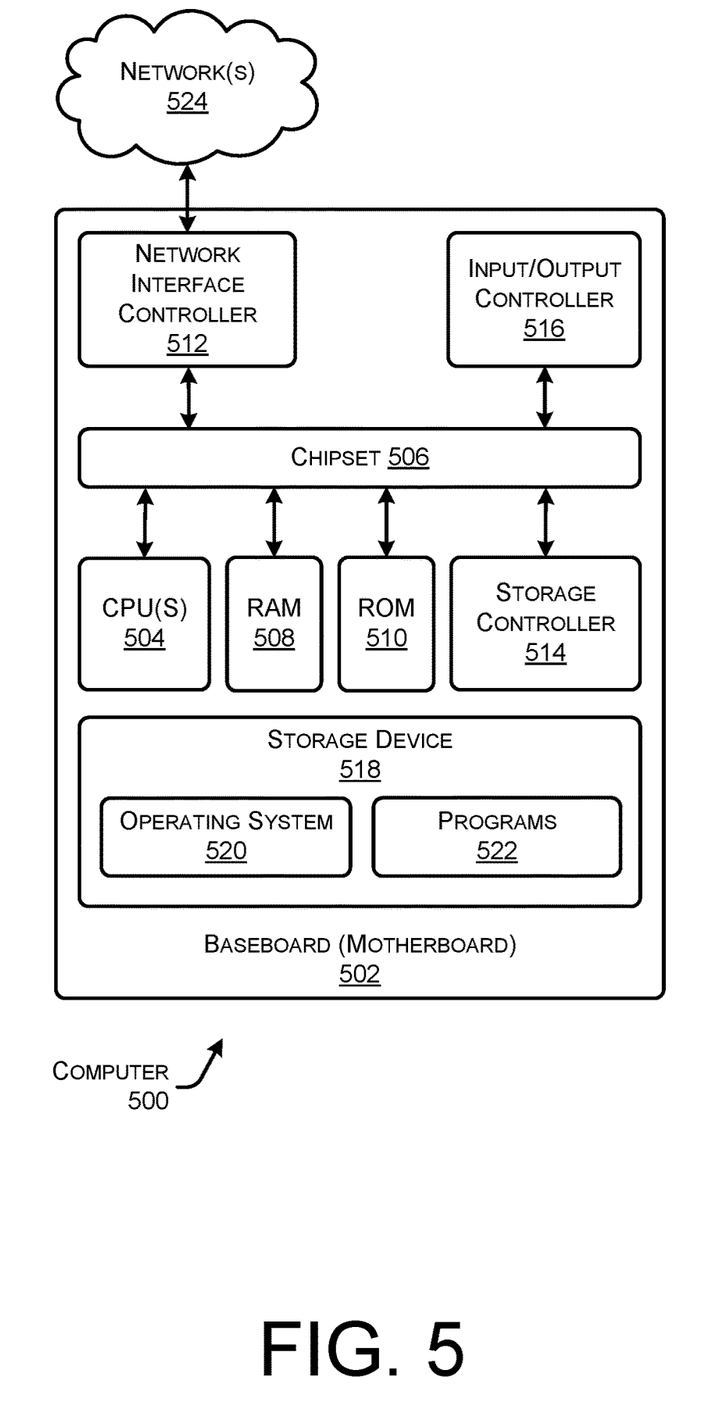
FIG. 5 is a computer architecture diagram illustrating an example computer hardware architecture for implementing an inspection device that can be utilized to implement aspects of the various technologies presented herein.

FIG. 5 is a computer architecture diagram illustrating an example computer hardware architecture for implementing an inspection device that can be utilized to implement aspects of the various technologies presented herein. The computer 500 shown in FIG. 5 illustrates a conventional server computer 402, coordinator node 102, storage node 104, index node 106, workstation, desktop computer, laptop, tablet, network appliance, e-reader, smartphone, and/or other computing device, and can be utilized to execute any of the software components presented herein.

The computer 500 includes a baseboard 502, or "motherboard," which is a printed circuit board to which a multitude of components or devices can be connected by way of a system bus or other electrical communication paths. In one illustrative configuration, one or more central processing units ("CPUs") 504 operate in conjunction with a chipset 506. The CPUs 504 can be standard programmable processors that perform arithmetic and logical operations necessary for the operation of the computer 500.

The CPUs 504 perform operations by transitioning from one discrete, physical state to the next through the manipulation of switching elements that differentiate between and change these states. Switching elements generally include electronic circuits that maintain one of two binary states, such as flip-flops, and electronic circuits that provide an output state based on the logical combination of the states of one or more other switching elements, such as logic gates. These basic switching elements can be combined to create more complex logic circuits, including registers, adders-subtractors, arithmetic logic units, floating-point units, and the like.

The chipset 506 provides an interface between the CPUs 504 and the remainder of the components and devices on the baseboard 502. The chipset 506 can provide an interface to a RAM 508, used as the main memory in the computer 500. The chipset 506 can further provide an interface to a computer-readable storage medium such as a read-only memory ("ROM") 510 or non-volatile RAM ("NVRAM") for storing basic routines that help to startup the computer 500 and to transfer information between the various components and devices. The ROM 510 or NVRAM can also store other software components necessary for the operation of the computer 500 in accordance with the configurations described herein.

The computer 500 may operate in a networked environment using logical connections to remote computing devices and computer systems through a network, such as the networks 524. The chipset 506 can include functionality for providing network connectivity through a NIC 512, such as a gigabit Ethernet adapter. The NIC 512 is capable of connecting the computer 500 to other computing devices over the networks 524 (and/or 102). It should be appreciated that multiple NICs 512 can be present in the computer 500, connecting the computer to other types of networks and remote computer systems.

The computer 500 can be connected to a storage device 518 that provides non-volatile storage for the computer. The storage device 518 can store an operating system 520, programs 522, and data, which have been described in greater detail herein. The storage device 518 can be connected to the computer 500 through a storage controller 514 connected to the chipset 506. The storage device 518 can consist of one or more physical storage units. The storage controller 514 can interface with the physical storage units through a serial attached SCSI ("SAS") interface, a serial advanced technology attachment ("SATA") interface, a fiber channel ("FC") interface, or other type of interface for physically connecting and transferring data between computers and physical storage units.

The computer 500 can store data on the storage device 518 by transforming the physical state of the physical storage units to reflect the information being stored. The specific transformation of physical state can depend on various factors, in different embodiments of this description. Examples of such factors can include, but are not limited to, the technology used to implement the physical storage units, whether the storage device 518 is characterized as primary or secondary storage, and the like.

For example, the computer 500 can store information to the storage device 518 by issuing instructions through the storage controller 514 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computer 500 can further read information from the storage device 518 by detecting the physical states or characteristics of one or more particular locations within the physical storage units.

In addition to the mass storage device 518 described above, the computer 500 can have access to other computer-readable storage media to store and retrieve information, such as program modules, data structures, or other data. It should be appreciated by those skilled in the art that computer-readable storage media is any available media that provides for the non-transitory storage of data and that can be accessed by the computer 500. In some examples, the operations performed by the distributed storage system 200 may be supported by one or more devices similar to computer 500. Stated otherwise, some or all of the operations performed by the networks 102, and or any components included therein, may be performed by one or more computer devices 500 operating in a cloud-based arrangement.

By way of example, and not limitation, computer-readable storage media can include volatile and non-volatile, removable and non-removable media implemented in any method or technology. Computer-readable storage media includes, but is not limited to, RAM, ROM, erasable programmable ROM ("EPROM"), electrically-erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage or other magnetic storage devices, or any other medium that can be used to store the desired information in a non-transitory fashion.

As mentioned briefly above, the storage device 518 can store an operating system 520 utilized to control the operation of the computer 500. According to one embodiment, the operating system comprises the LINUX operating system. According to another embodiment, the operating system comprises the WINDOWS® SERVER operating system from MICROSOFT Corporation of Redmond, Wash. According to further embodiments, the operating system can comprise the UNIX operating system or one of its variants. It should be appreciated that other operating systems can also be utilized. The storage device 518 can store other system or application programs and data utilized by the computer 500.

In one embodiment, the storage device 518 or other computer-readable storage media is encoded with computer-executable instructions which, when loaded into the computer 500, transform the computer from a general-purpose computing system into a special-purpose computer capable of implementing the embodiments described herein. These computer-executable instructions transform the computer 500 by specifying how the CPUs 504 transition between states, as described above. According to one embodiment, the computer 500 has access to computer-readable storage media storing computer-executable instructions which, when executed by the computer 500, perform the various processes described above with regard to FIGS. 1A-4. The computer 500 can also include computer-readable storage media having instructions stored thereupon for performing any of the other computer-implemented operations described herein.

The computer 500 can also include one or more input/output controllers 516 for receiving and processing input from a number of input devices, such as a keyboard, a mouse, a touchpad, a touch screen, an electronic stylus, or other type of input device. Similarly, an input/output controller 516 can provide output to a display, such as a computer monitor, a flat-panel display, a digital projector, a printer, or other type of output device. It will be appreciated that the computer 500 might not include all of the components shown in FIG. 5, can include other components that are not explicitly shown in FIG. 5, or might utilize an architecture completely different than that shown in FIG. 5.

The computer 500 may include one or more hardware processors 504 (processors) configured to execute one or more stored instructions. The processor(s) 504 may comprise one or more cores. Further, the computer 500 may include one or more network interfaces configured to provide communications between the computer 500 and other devices or nodes. The network interfaces may include devices configured to couple to personal area networks (PANs), wired and wireless local area networks (LANs), wired and wireless wide area networks (WANs), and so forth. For example, the network interfaces may include devices compatible with Ethernet, Wi-Fi™, and so forth.

The programs 522 may comprise any type of programs or processes to perform the techniques described in this disclosure for generating a crash-consistent clone of a file stored by a distributed file system and that is usable in a virtual machine. Additionally, the programs 522 may comprise instructions that cause the computer 500 to perform the specific techniques for generating crash-consistent clones of files.

While the invention is described with respect to the specific examples, it is to be understood that the scope of the invention is not limited to these specific examples. Since other modifications and changes varied to fit particular operating requirements and environments will be apparent to those skilled in the art, the invention is not considered limited to the example chosen for purposes of disclosure, and covers all changes and modifications which do not constitute departures from the true spirit and scope of this invention.

Although the application describes embodiments having specific structural features and/or methodological acts, it is to be understood that the claims are not necessarily limited to the specific features or acts described. Rather, the specific features and acts are merely illustrative some embodiments that fall within the scope of the claims of the application.

What is claimed is:

1. A method for generating a crash-consistent clone of a file associated with a virtual machine, the method comprising:
   receiving, at a coordinator node of a distributed file system, a request to generate the crash-consistent clone of the file;
   identifying, by the coordinator node, multiple storage nodes of the distributed file system that are storing different portions of data of the file, the multiple storage nodes including at least a first storage node storing a first portion of the data and a second storage node storing a second portion of the data;
   sending, by the coordinator node, a first command to the multiple storage nodes, the first command configured to cause each one of the multiple storage nodes to:
   quiesce the file,
   wherein quiescing the file for the first storage node comprises:
      waiting for a first index node (inode) associated with the first storage node to complete a first write operation that was acknowledged prior to receiving the first command, and
      marking the first inode as quiesced based at least in part on a determination that the first write operation was completed,
   wherein quiescing the file for the second storage node comprises:
      waiting for a second inode associated with the second storage node to complete a second write operation that was acknowledged prior to receiving the first command, and
      marking the second inode as quiesced based at least in part on a determination that the second write operation was completed; and
   subsequent to each one of the multiple storage nodes quiescing the file, clone the different portions of the data to generate the crash-consistent clone of the file;
   receiving, at the coordinator node and from the multiple storage nodes, a status associated with generating the crash-consistent clone of the file; and
   based at least in part on the status, sending, by the coordinator node, a second command to the multiple storage nodes, the second command configured to cause each one of the multiple storage nodes to unquiesce the file.

2. The method of claim 1, wherein quiescing the file further comprises refraining from completing, by the multiple storage nodes, write operations that were received by the multiple storage nodes after receiving the first command.

3. The method of claim 1, wherein unquiescing the file comprises completing, by the multiple storage nodes, write operations that were received by the multiple storage nodes after receiving the first command.

4. The method of claim 1, wherein quiescing the file comprises storing, in a queue, write operations that were received by the multiple storage nodes after receiving the first command, the method further comprising, based at least in part on receiving the second command, completing, by the multiple storage nodes, the write operations stored in the queue.

5. The method of claim 1, wherein the status indicates a failure associated with generating the crash-consistent clone of the file and the second command is further configured to cause each of the multiple storage nodes to delete the crash-consistent clone.

6. The method of claim 1, wherein the first portion of the data is a first stripe of the data of the file and the second portion of the data is a second stripe of the data of the file.

7. The method of claim 1, wherein:
   unquiescing the file for the first storage node comprises:
      unmarking the first inode as quiesced, and
      causing the first inode to complete a third write operation that was stored while the first inode was marked as quiesced; and
   unquiescing the file for the second storage node comprises:
      unmarking the second inode as quiesced, and
      causing the second inode to complete a fourth write operation that was stored while the second inode was marked as quiesced.

8. A system comprising:
   one or more processors; and
   one or more non-transitory computer-readable media storing instructions that, when executed by the one or more processors, cause the one or more processors to perform operations comprising:
   receiving, at a coordinator node of a distributed file system, a request to generate a crash-consistent clone of a file;
   identifying, by the coordinator node, multiple storage nodes of the distributed file system that are storing different portions of data of the file, the multiple storage nodes including at least a first storage node storing a first portion of the data and a second storage node storing a second portion of the data;
   sending, by the coordinator node, a first command to the multiple storage nodes, the first command configured to cause each one of the multiple storage nodes to:
   quiesce the file,
   wherein quiescing the file for the first storage node comprises:
      waiting for a first index node (inode) associated with the first storage node to complete a first write operation that was acknowledged prior to receiving the first command, and
      marking the first inode as quiesced based at least in part on a determination that the first write operation was completed,
   wherein quiescing the file for the second storage node comprises:
      waiting for a second inode associated with the second storage node to complete a second write operation that was acknowledged prior to receiving the first command, and
      marking the second inode as quiesced based at least in part on a determination that the second write operation was completed; and
   subsequent to each one of the multiple storage nodes quiescing the file, clone the different portions of the data to generate the crash-consistent clone of the file;
   receiving, at the coordinator node and from the multiple storage nodes, a status associated with generating the crash-consistent clone of the file; and
   based at least in part on the status, sending, by the coordinator node, a second command to the multiple storage nodes, the second command configured to cause each one of the multiple storage nodes to unquiesce the file.

9. The system of claim 8, wherein quiescing the file comprises refraining from completing, by the multiple storage nodes, write operations that were received by the multiple storage nodes after receiving the first command.

10. The system of claim 8, wherein unquiescing the file comprises completing, by the multiple storage nodes, write operations that were received by the multiple storage nodes after receiving the first command.

11. The system of claim 8, wherein quiescing the file comprises storing, in a queue, write operations that were received by the multiple storage nodes after receiving the first command, the operations further comprising, based at least in part on receiving the second command, completing, by the multiple storage nodes, the write operations stored in the queue.

12. The system of claim 8, wherein the status indicates a failure associated with generating the crash-consistent clone of the file and the second command is further configured to cause each of the multiple storage nodes to delete the crash-consistent clone.

13. The system of claim 8, wherein the first portion of the data is a first stripe of the data of the file and the second portion of the data is a second stripe of the data of the file.

14. The system of claim 8, wherein:
unquiescing the file for the first storage node comprises:
unmarking the first inode as quiesced, and
causing the first inode to complete a third write operation that was stored while the first inode was marked as quiesced; and
unquiescing the file for the second storage node comprises:
unmarking the second inode as quiesced, and
causing the second inode to complete a fourth write operation that was stored while the second inode was marked as quiesced.

15. One or more non-transitory computer-readable media storing instructions that, when executed by one or more processors, cause the one or more processors to perform operations comprising:
receiving, at a coordinator node of a distributed file system, a request to generate a crash-consistent clone of a file;
identifying, by the coordinator node, multiple storage nodes of the distributed file system that are storing different portions of data of the file, the multiple storage nodes including at least a first storage node storing a first portion of the data and a second storage node storing a second portion of the data;
sending, by the coordinator node, a first command to the multiple storage nodes, the first command configured to cause each one of the multiple storage nodes to:
quiesce the file,
wherein quiescing the file for the first storage node comprises:
waiting for a first index node (inode) associated with the first storage node to complete a first write operation that was acknowledged prior to receiving the first command, and
marking the first inode as quiesced based at least in part on a determination that the first write operation was completed,
wherein quiescing the file for the second storage node comprises:
waiting for a second inode associated with the second storage node to complete a second write operation that was acknowledged prior to receiving the first command, and
marking the second inode as quiesced based at least in part on a determination that the second write operation was completed; and
subsequent to each one of the multiple storage nodes quiescing the file, clone the different portions of the data to generate the crash-consistent clone of the file;
receiving, at the coordinator node and from the multiple storage nodes, a status associated with generating the crash-consistent clone of the file; and
based at least in part on the status, sending, by the coordinator node, a second command to the multiple storage nodes, the second command configured to cause each one of the multiple storage nodes to unquiesce the file.

16. The one or more non-transitory computer-readable media of claim 15, wherein quiescing the file comprises refraining from completing, by the multiple storage nodes, write operations that were received by the multiple storage nodes after receiving the first command.

17. The one or more non-transitory computer-readable media of claim 15, wherein unquiescing the file comprises completing, by the multiple storage nodes, write operations that were received by the multiple storage nodes after receiving the first command.

18. The one or more non-transitory computer-readable media of claim 15, wherein quiescing the file comprises storing, in a queue, write operations that were received by the multiple storage nodes after receiving the first command, the operations further comprising, based at least in part on receiving the second command, completing, by the multiple storage nodes, the write operations stored in the queue.

19. The one or more non-transitory computer-readable media of claim 15, wherein the status indicates a failure associated with generating the crash-consistent clone of the file and the second command is further configured to cause each of the multiple storage nodes to delete the crash-consistent clone.

20. The one or more non-transitory computer-readable media of claim 15, wherein:
unquiescing the file for the first storage node comprises:
unmarking the first inode as quiesced, and
causing the first inode to complete a third write operation that was stored while the first inode was marked as quiesced; and
unquiescing the file for the second storage node comprises:
unmarking the second inode as quiesced, and
causing the second inode to complete a fourth write operation that was stored while the second inode was marked as quiesced.

* * * * *